US008436118B2

(12) United States Patent
Tang et al.

(10) Patent No.: US 8,436,118 B2
(45) Date of Patent: May 7, 2013

(54) SYNTHESIS OF ACYLARYLENES AND HYPERBRANCHED POLY(ACLARYLENE)S BY METAL-FREE CYCLOTRIMERIZATION OF ALKYNES

(75) Inventors: Benzhong Tang, Hong Kong (CN); Ka Wai Jim, Hong Kong (CN); Anjun Qin, Hong Kong (CN); Matthias Haeussler, Bad Lauchstaedt (DE); Wing Yip Lam, Hong Kong (CN)

(73) Assignee: The Hong Kong University of Science and Technology, Kowloon, Hong Kong (CN)

( * ) Notice: Subject to any disclaimer, the term of this patent is extended or adjusted under 35 U.S.C. 154(b) by 712 days.

(21) Appl. No.: 12/451,527

(22) PCT Filed: Mar. 4, 2008

(86) PCT No.: PCT/CN2008/000429
§ 371 (c)(1),
(2), (4) Date: Nov. 17, 2009

(87) PCT Pub. No.: WO2008/151499
PCT Pub. Date: Dec. 18, 2008

(65) Prior Publication Data
US 2010/0129757 A1 May 27, 2010

Related U.S. Application Data

(60) Provisional application No. 60/933,884, filed on Jun. 11, 2007.

(51) Int. Cl.
*C08F 138/00* (2006.01)
*C08F 38/00* (2006.01)
*C07C 15/00* (2006.01)
*C07C 15/02* (2006.01)

(52) U.S. Cl.
USPC ............................ 526/285; 585/400; 585/416

(58) Field of Classification Search .................... None
See application file for complete search history.

(56) References Cited

U.S. PATENT DOCUMENTS 5,370,974 A   12/1994   Agostino et al.
5,494,058 A   2/1996    Chan
(Continued)

FOREIGN PATENT DOCUMENTS

EP    0 263 259 A2    4/1988
JP    63-091333 A     4/1988

OTHER PUBLICATIONS

Dong et al, "A New Route to Hyperbranched Macromolecules: Syntheses of Photosensitive Poly(aroylarylene)s via 1,3,5-Regioselctive Polycyclotrimerization of Bis(aroylacetylene)s", Macromolecules, 38, 6382-6391 (2005).*

(Continued)

*Primary Examiner* — Amanda C. Walke
(74) *Attorney, Agent, or Firm* — Nath, Goldberg & Meyer; Joshua B. Goldberg; Tanya E. Harkins

(57) ABSTRACT

The present invention provides a new metal-free cyclotrimerization reaction of alkynes to produce a 1,3,5-triacylarylene or 1,3,5-triacylbenzene. This reaction is catalyzed by secondary amines, is strictly regioselective, highly functionality-tolerant, and the resulting product can be obtained in high yields. This reaction can be further applied for the preparation of novel branched (co)polymers bearing the triacylarylenes as structural units. The preparation of the (co)polymers is carried out as a one-pot single-step reaction procedure, giving branched oligomers and polymers in high yields up to 90%. The produced (co)polymers are also processible, easily film-forming, and thermally stable.

28 Claims, 15 Drawing Sheets

U.S. PATENT DOCUMENTS

| | | | |
|---|---|---|---|
| 5,514,764 | A | 5/1996 | Frechet et al. |
| 5,686,027 | A | 11/1997 | Olsen et al. |
| 6,759,502 | B1 | 7/2004 | Tang et al. |
| 7,807,759 | B2 * | 10/2010 | Shin et al. .................. 525/535 |
| 8,143,465 | B2 * | 3/2012 | Tang et al. ................. 585/416 |
| 2006/0247410 | A1 | 11/2006 | Tang et al. |

OTHER PUBLICATIONS

Tiwari, R.K. et al; "Nucleophilic addition to aryl ethynyl ketone: Addition of oxygen containing nucleophiles to terephthaloyl acetylene", *Indian Journal of Chemistry*, vol. 35B, pp. 1263-1266, (Dec. 1996).

Häussler, M., et al., "Synthesis, Thermal Stability, and Linear and Nonlinear Optical Properties of Hyperbranched Polyarylenes Containing Carbazole and/or Fluorene Moieties", *Macromolecules*, 40, pp. 1914-1925, (2007).

Häußler, M. et al. "Hyperbranched polyarlenes", *C. R. Chimie* 6, www.sciencedirect.com, pp. 833-842, Elsevier, (2003).

Pigge, F.C., et al., "Synthesis of linked 1, 3, 5-triaroylbenzenes via enamine-directed alkyne cyclotrimerization", *Tetrahedron Letters*, 41, pp. 6545-6549, (2000).

Pigge, F.C. et al., "An Enaminone-Directed Benzannulation/Macrocyclization Approach to Cyclophane Ring Systems", *J. Org. Chem.*, 67, pp. 4547-4552, (2002).

Balasubramanian, K.K., et al., "Trimerisation of Aryl Ethynyl Ketones" *Synthesis, Communication*, pp. 29-30, (Jan. 1980).

Sakata, Y., et al., "In situ Infrared Spectroscopic Evidence for Cyclotrimerisation of Acetylene to Benzene over a $TiO_2$ Catalyst", *J. Chem. Soc., Chem. Commun.* pp. 1392-1393, (1991).

Berthelot, P. M., "Action de la Chaleur sur Quelques Carbures D'hydrogéne", Ann. Chim. Phys. 9, 445-469, (1866).

Zheng, R., et al., "Construction of Hyperbranched Poly (alkenephenylene)s by Diyne Polycyclotrimerization: Single-Component Catalyst, Glycogen-like Macromolecular Structure. Facile Thermal Curing, and Strong Thermolysis Resistance", *Macromolecules*, 37, pp. 5196-5210, (2004).

\* cited by examiner $^1$H NMR spectra of (A) 12, (B) 13 in DMSO-$d_6$. The solvent peaks are marked with asterisks (*).

¹H NMR spectra of (A) monomer 3, (B) model compound 13, and (C) *hb*-P3 in DCM-$d_2$. The solvent peaks are marked with asterisks (*).

$^{13}$C NMR spectra of (A) monomer 3, (B) model compound 13, and (C) *hb*-P3 in dichloromethane–$d_2$. The solvent peaks are marked with asterisks (*).

$^1$H NMR spectra of (A) hb-P2, (B) hb-P5 in dichloromethane-$d_2$. The solvent peaks are marked with asterisks (*).

$^1$H NMR spectrum of hb-P4 in DMSO-$d_6$. The solvent peaks are marked with asterisks (*).

IR spectra of (A) monomer 1 and (B) its polymer *hb*-P1.

IR spectra of (A) monomer 2 and (B) its polymer hb-P2.

IR spectra of (A) monomer 3 and (B) its polymer *hb*-P3.

IR spectra of (A) monomer 4 and (B) its polymer *hb*-P4.

IR spectra of (A) monomer 5 and (B) its polymer hb-P5.

UV absorption spectra of THF solutions of hb-P2, hb-P3, and hb-P5.

TGA thermograms of hyperbranched poly(aroxycarbonylphenylene)s hb-P1–P5 recorded under nitrogen at a heating rate of 20 °C/min.

Negative pattern generated by photolithography of hb-P3.

Wavelength dependence of refractive index of a thin film of *hb*-P3 before (dash line) and after UV irridation for 30 min (solid line).

SYNTHESIS OF ACYLARYLENES AND HYPERBRANCHED POLY(ACLARYLENE)S BY METAL-FREE CYCLOTRIMERIZATION OF ALKYNES

This is a U.S. national phase Application filed under 35 U.S.C. 371 of PCT/CN2008/000429 A1, filed 4 Mar. 2008 claiming priority benefit from U.S. Provisional Application No. 60/933,884, filed 11 Jun. 2007, the entire content of which is hereby incorporated by reference.

CROSS-REFERENCE TO RELATED APPLICATIONS

Pursuant to 35 U.S.C. §119(e), this application claims the benefit of U.S. Provisional Application Ser. No. 60/933,884, filed Jun. 11, 2007 in the name of Benzhong Tang et al. and entitled "Synthesis of acylarylenes and hyperbranched poly (acylarylene)s by metal-free cyclotrimerization of alkynes", said provisional application being hereby incorporated by reference as if fully set forth herein.

FIELD OF THE INVENTION

The present invention relates to branched or hyperbranched polymer materials and the preparation thereof. Particularly, the present invention relates to branched or hyperbranched (co)polymers bearing a 1,3,5-triacylarylene as a structural unit, the preparation thereof by a metal-free, regioselective cyclotrimerization of alkynes, and the use of the polymers.

BACKGROUND OF THE INVENTION

Hyperbranched polymers are envisioned to possess interesting properties such as low viscosity and high thermal stability due to their substantially globular molecular architectures and to serve as functional materials. Realization of the full potential of hyperbranched polymers calls for the exploration of new, versatile methods for the preparation thereof. A variety of hyperbranched polymers have been prepared by condensation polymerization of so-called $AB_n$-type ($n \geq 2$) monomers wherein A and B functions condense together to form branched polymers, for instance, hyperbranched polyester and polyamide polymers prepared by Frechet. J. M. J. (U.S. Pat. No. 5,514,764). In this preparation, however, competitive reactions often lead to the formation of linear chains, producing imperfect polymers with a low degree of branching and low molecular weight.

Cyclotrimerization of alkynes is a reaction where three alkynes cyclize into a benzene ring. This kind of [2+2+2] cycloaddition was first reported by Berthelot, M. in 1866 (*Ann. Chim. Phys.*, 1866, 9, 446) and has now been developed into a widely used methodology in organic synthesis. Normally, the cyclotrimerization reaction of triple bonds requires the presence of transition metal catalysts (*Chem. Comm.*, 1991, 19, 1392), which often results in the formation of mixtures of 1,2,4- and 1,3,5-substituted benzene regioisomers. Moreover, many transition metal catalyst complexes are functional group intolerant. In 1980, Balasubramanian, K reported for the first time the cyclotrimerization of benzoylacetylenes (*Synthesis*, 1980, 29). The reaction is known to be strictly regioselective and to yield only 1,3,5-triaroylbenzene (*Org. Chem.*, 2002, 67, 4547). Another advantage of this reaction is that instead of a transition metal catalyst, the reaction proceeds refluxing in dimethylformamide (DMF) or in the presence of additional secondary amines as catalysts (*Tetra. Lett.*, 2000, 41, 6545 and *J. Org. Chem.* 2002, 67, 4547). The ethynylketones are prepared from substituted benzaldehydes through reaction with ethynylmagnesium bromide and followed by oxidation with $MnO_2$ or $CrO_3$. However, the synthesis of the benzoylacetylenes is a multi-step procedure involving organometallic complexes such as ethynylmagnesium bromide and toxic heavy metal oxides such as $MnO_2$ or $CrO_3$. Additionally, strict reaction conditions such as exclusion of air and moisture need to be applied.

Cycloaddition of diacetylenes (or diynes) has been used as an elementary reaction for the construction of hyperbranched polymers with high molecular weight and degree of branching because the polycyclotrimerization mechanism is intolerant toward the formation of linear repeat units inside the hyperbranched core. For instance, Olsen, R. E. prepared a novel polyphenylene resin by copolycyclotrimerization of vinylethynylbenzene, diethynylbenzene, and phenylacetylene (U.S. Pat. Nos. 5,686,027 and 5,594,058) initiated by Ziegler catalysts. The obtained polymer is used in the construction of high-performance carbon-carbon composites. This reaction system is, however, complex. Ben Zhong Tang's group has successfully synthesized soluble hyperbranched poly(alkenephenylene)s and poly(arylene)s by polycyclotrimerization of diynes with tantalum and cobalt complexes as the catalysts (*Macromolecules*, 2007, 40, 1914, *Macromolecules*, 2004, 37, 5196 and C. R. *Chimie*, 2003, 6, 833). However, as the methods for polymerization mentioned above involved a transition metal catalyst and yielded a regio-irregular polymer, some scientists have tried to apply regioselective methods for the synthesis of hyperbranched polymers. Tiwari, R. K. reported a branched polymer containing triaroylbenzene moieties (*Indian Journal of Chemistry*, 1996, 35B, 1263) and a process for making the same. However, the resultant polymer is not soluble in most organic solvents, which makes the characterization and the application of the polymer difficult.

Tang, has successfully synthesized soluble triaroylbenzene-based branched (co)polymers (U.S. patent application Ser. No. 11/417,290). The resultant polymers are soluble in common organic solvents, have high thermal stability and photosensitivity and function as photoresist materials. The monomer building blocks, however, require the presence of an aromatic moiety next to the carbonylacetylene group (aroylacetylene or diaroylacetylene), which are synthetically only accessible through multi-step procedures involving moisture sensitive organometallic complexes and toxic heavy metal compounds.

Accordingly, there has been a need to develop an easy and fast one-step procedure with a mild condition for the preparation of hyperbranched polymers, as well as their monomer building blocks.

In the present invention, the cyclotrimerization of propiolates in the absence of metal has been discovered and for the first time the cycloaddition of bis(acylacetylene)s has been used to prepare processible hyperbranched (co)poly(acylarylene)s.

SUMMARY OF THE INVENTION

The present invention provides a new cyclotrimerization reaction of alkynes to produce a 1,3,5-triacylarylene, or 1,3,5-triacylbenzene. This reaction is catalyzed by secondary amines, is strictly regioselective, highly functionality-tolerant, and the resulting product can be obtained in high yields. This reaction can be further applied for the preparation of novel branched (co)polymers bearing the triacylarylenes as structural units. The preparation of the (co)polymers is carried out as a one-pot single-step reaction procedure, giving branched oligomers and polymers in high yields up to 90%. The produced (co)polymers are also processible, easily film-forming, and thermally stable.

Accordingly, an object of the present invention is to provide soluble and processible branched or hyperbranched polymers comprising a plurality of end units and a plurality of internal units, said internal unit being of formula (I):

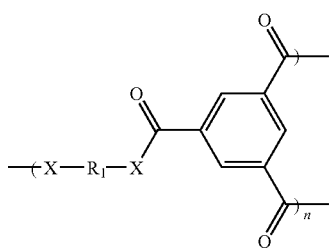

(I)

wherein X—$R_1$—X is a remainder of diacylacetylene, X is O, NH and S, n is greater than 1, and said internal units have identical $R_1$ or different $R_1$.

Another object of the present invention is to provide a new method for the preparation of triacylarylene (or triacylbenzene) having the formula (II) or the polymers thereof, comprising the following cyclotrimerization reaction of acylacetylenes:

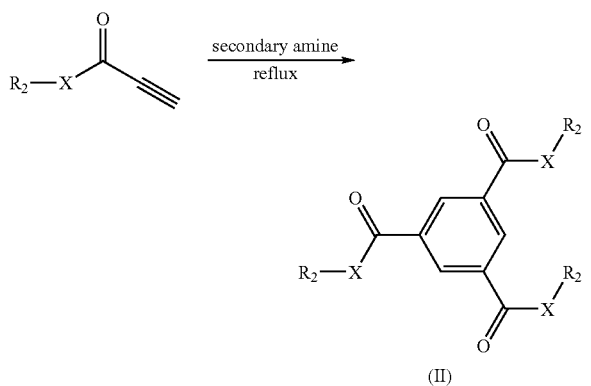

(II)

wherein $R_2$ is selected from any organo or organometallic groups, $R_2$—X in the formula (II) is a remainder of the acylacetylenes, X is O, NH, or S, and the triacylarylene of formula (II) has identical $R_2$ or different $R_2$. The cyclotrimerization is accomplished regioselectively in the absence of metal.

Another object of the present invention is to provide a method for the preparation of the polymers having the formula (I) as its internal units, comprising the following polymerization step:

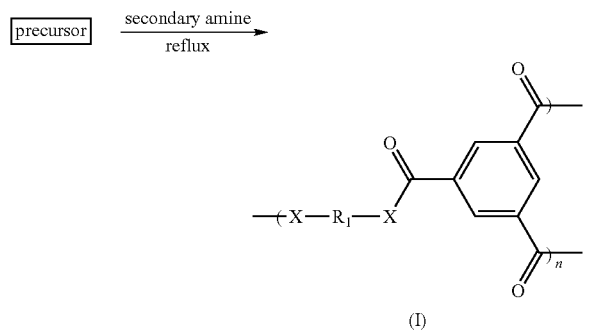

(I)

wherein said precursor comprises one or more diacylacetylenes, X—$R_1$—X is a remainder of the diacylacetylenes, X is O, NH or S, n is greater than 1, and said internal units have an identical $R_1$ or different $R_1$. The polymerization is preferably accomplished regioselectively by the polycyclotrimerization of the precursors in the absence of metal. Further, the precursors may further comprise one or more monoynes for end-capping of the polymers. The diacylacetylenes used as precursor are preferably prepared by a simple condensation reaction between any organic or organometallic diol, diamine or dithiol functional group and propiolic acid.

Another object of the present invention is to provide a method for photo-patterning comprising a step of applying an energy source to said (co)polymers of formula (I) and to provide a thermoset comprising said (co) polymers. The energy source may be UV-irradiation, E-bean or laser. UV-irradiation is preferred for the present invention.

The various features of novelty which characterize the invention are pointed out with particularity in the claims annexed to and forming a part of this disclosure. For a better understanding of the invention, its operating advantages, and specific objects attained by its use, reference should be made to the drawings and the following description in which there are illustrated and described preferred embodiments of the invention.

DETAILED DESCRIPTION OF THE INVENTION

Definitions

Figure 1:
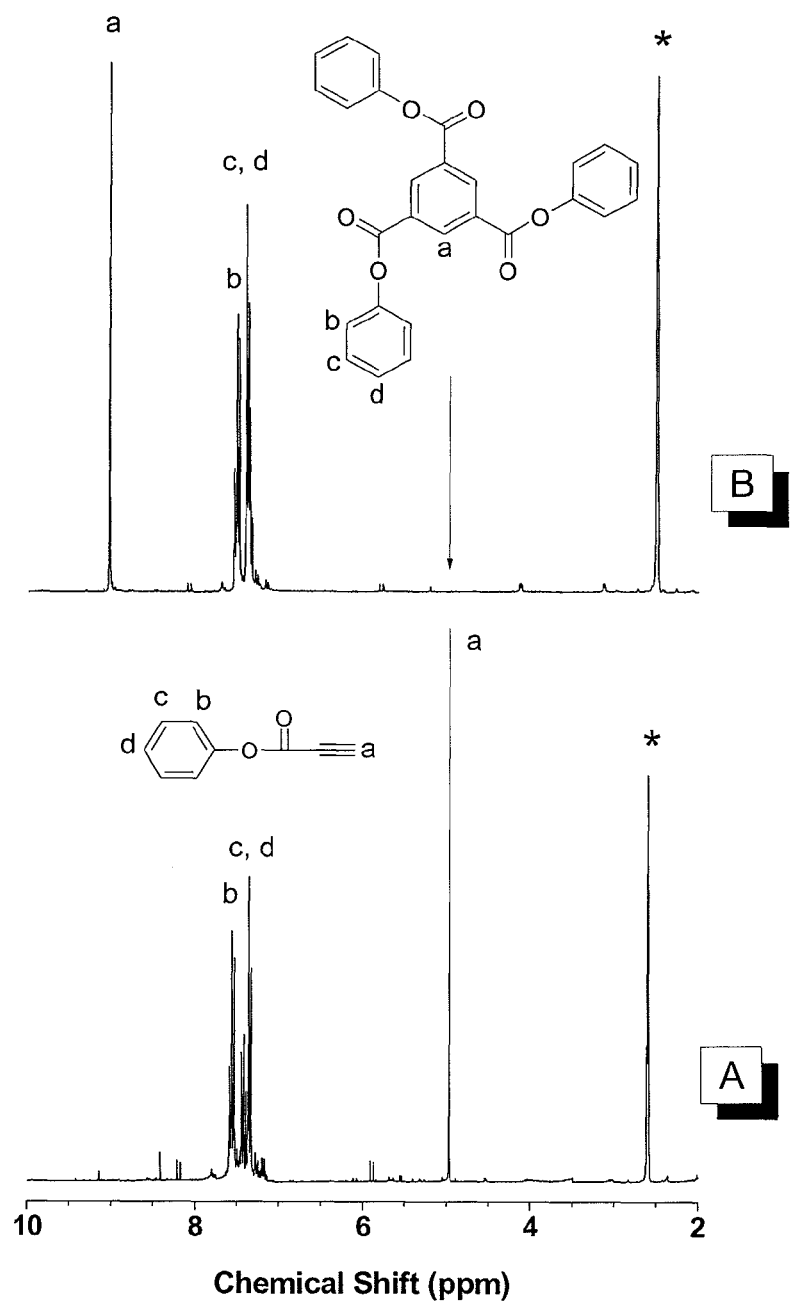
FIG. 1 shows $^1$H NMR spectra of phenyl acetylenecarboxylate (Compound 12) and triphenylbenzene-1,3,5-tricarboxylate (Compound 13) in DMSO-$d_6$.

The following definitions are provided for the purpose of understanding the present invention and the appended patent claims:

"Remainder of a diacylacetylene" means the organo or organometallic group of a diacylacetylene minus two carbonylacetylene groups.

"Remainder of a monoacylacetylene" means the organo or organometallic group of a monoacylacetylene minus one carbonylacetylene group.

"Diacylacetylene" is a compound comprising two carbonylacetylene groups and, as a special meaning used in this disclosure, "diacylacetylene" also means a compound having more than two carbonylacetylene groups. Further, as can be seen in the structure of diacylacetylene in this disclosure, "diacylacetylene" comprises a radical X in the structure where X is O, NH or S. "Diacylacetylene" is also referred to diyne in this disclosure.

"Monoyne" means a compound having only one carbonylacetylene group. Similarly to the term "diacylacetylene", "monoyne" in this disclosure comprises a radical X in the structure where X is O, NH or S.

"End unit" of the polymer of the present invention means a monoacylacetylene or diacylacetylene which has only one carbonylacetylene group participating in polymerization.

Cyclotrimerization and Polymerization

The method for the cyclotrimerization of alkynes of the present invention comprises the following reaction of alkynes having the general structure 6 as shown in Scheme 1, where R is independently selected from any type of organic or organometallic groups and X is O, NH or S.

This successful cyclotrimerization reaction can be utilized for the preparation of soluble and processible (hyper) branched oligomers and (co)polymers (hb-P10) containing triacylarylene (or triacylbenzene) moieties as shown in the Scheme 2:

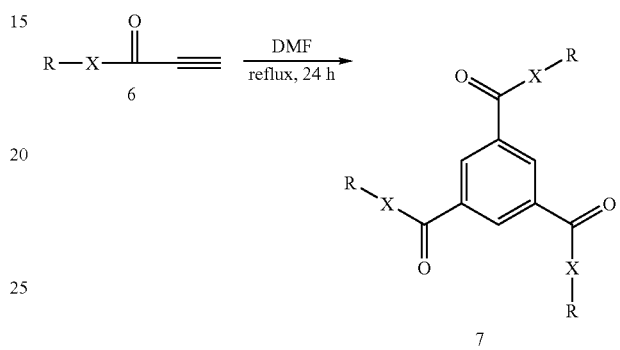

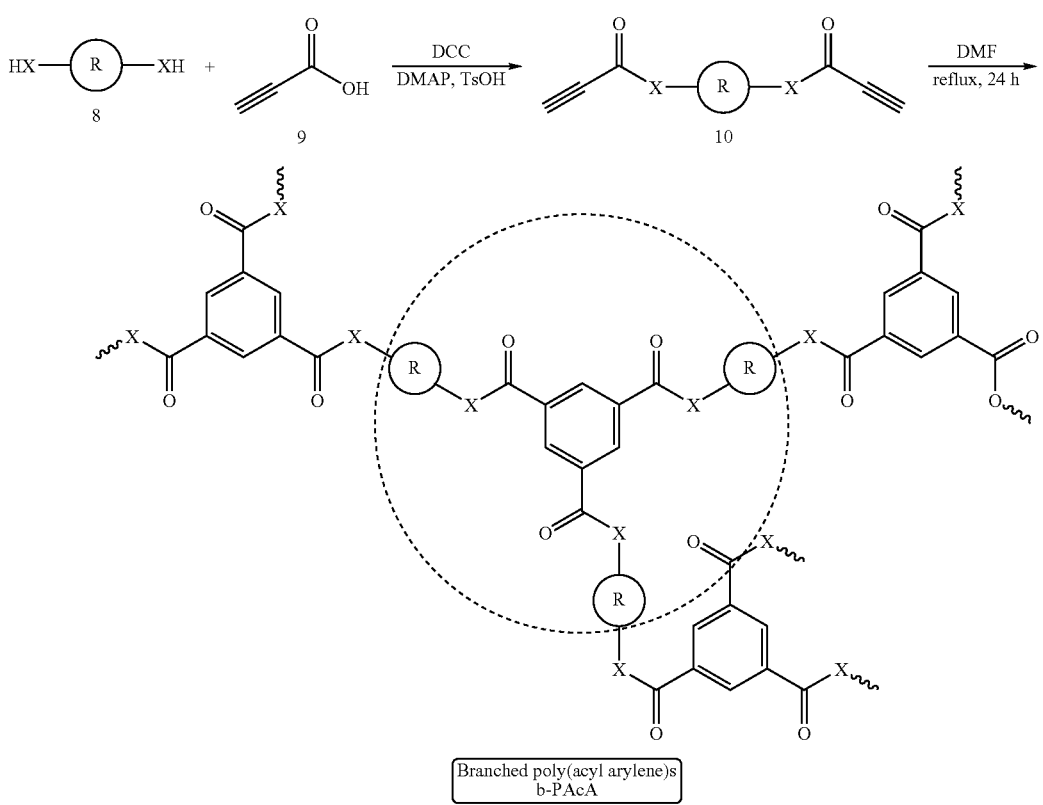

This invention can be extended to every imaginable compound possessing one or two or more polymerizable organic or organometallic propiolate-type functionalities preferentially if they are connected to the structural moiety such as for example, O, NH or S. These compounds can be used as precursor for the polymerization of the present invention and cyclotrimerized by reflux in a secondary amine. The polymerization of the present invention accordingly comprises the following step:

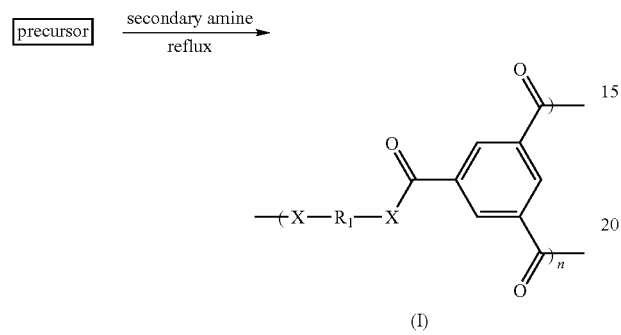

(I)

wherein said precursor comprises one or more diacylacetylenes, X—$R_1$—X is a remainder of the diacylacetylenes, X is O, NH or S, and n is greater than 1. The precursors may be substituted by a person of ordinary skill in the art to afford various substituted compounds of the present invention as mentioned above. Compounds possessing one carbonylacetylene group may be used in the present invention as comonomer for functionalizing and capping the polymer. Accordingly, the precursor may further comprise one or more monoynes for end-capping the polymers of the present invention. Processible materials can be obtained by homopolymerization and copolymerization of diynes with monoynes and/or other diynes in different ratios under optimized reaction conditions such as solvent, polymerization time, temperature, concentration of monomers, and catalyst. In homopolymerization, $R_1$ is identical in all internal units of the polymer and in copolymerization, $R_1$ may be different in different internal units because different precursors of diacylacetylenes with different $R_1$ are used. The conditions can be ascertained by one of ordinary skill in the art without undue experimentation. For instance, large amounts of monoynes in the reaction will end-cap the polymer and the degree of branching tends to be smaller.

The cyclotrimerization reaction is preferably conducted in dimethylformamide (DMF) with refluxing the alkynes of general structure 6 for at least 20 hours to up to 60 hours, preferably 24 hours under nitrogen or in air. Other secondary amines represented by the formula RNHR', where R and R' represent aliphatic or aromatic group being identical to or different from each other. Non-limiting examples of the secondary amines that may be used for the present invention include piperidine, diethylamine, diphenylamine, N,N-Diisopropylethylamine (DIPEA), 1,8-Diazabicycloundec-7-ene (DBU) etc. When piperidine is used as a secondary amine, it may be used in dioxane.

To initiate the benzene ring formation, ester (when X is OH), amide (when X is N) or thiolate (when X is S) functionalities are sufficient in the cyclotrimerization reaction of the present invention. In the cyclotrimerization reaction according to the present invention, the monomeric diacetylene building blocks can be obtained by a simple condensation reaction between any organic or organometallic dial (8a, X=O), diamine (8b, X=NH) or dithiol (8c, X=S) functional group and propiolic acid 9.

Scheme 3 illustrates one embodiment of the present invention to obtain phenyl acetylenecarboxylate 12 and the cyclotrimerization reaction of the phenyl acetylenecarboxylate to obtain triphenyl benzene-1,3,5-tricarboxylate 13, a cyclotrimerized product.

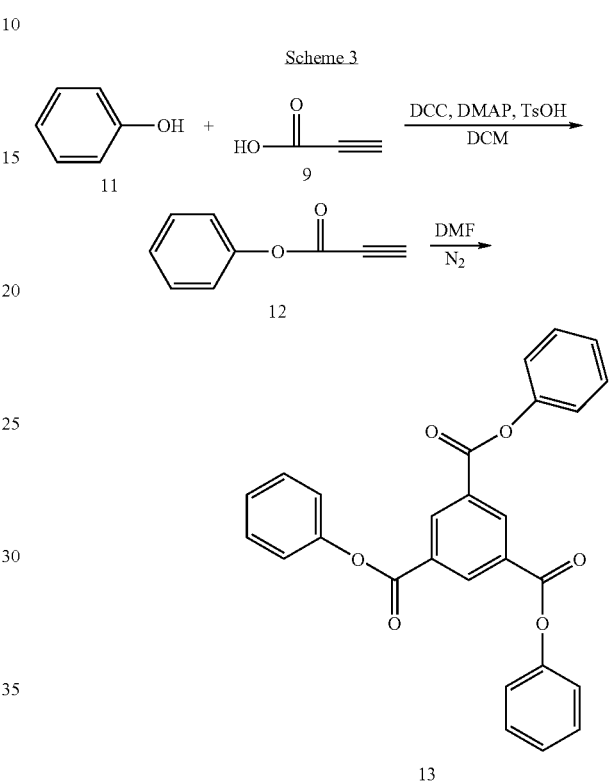

In the reaction, phenyl acetylenecarboxylate 12 is readily obtained by a simple condensation of phenol 11 and propiolic acid 9 using 1,3-dicyclohexylcarbodiimine (DCC), 4-(dimethylamino)pyridine (DMAP), 4-toluenesulfonic acid (TsOH) and Dichloromethane (DCM). Refluxing the obtained phenyl acetylenecarboxylate 12 in DMF for 24 hours under nitrogen yields the cyclotrimerized product of triphenyl benzene-1,3,5-tricarboxylate 13.

Figure 2:
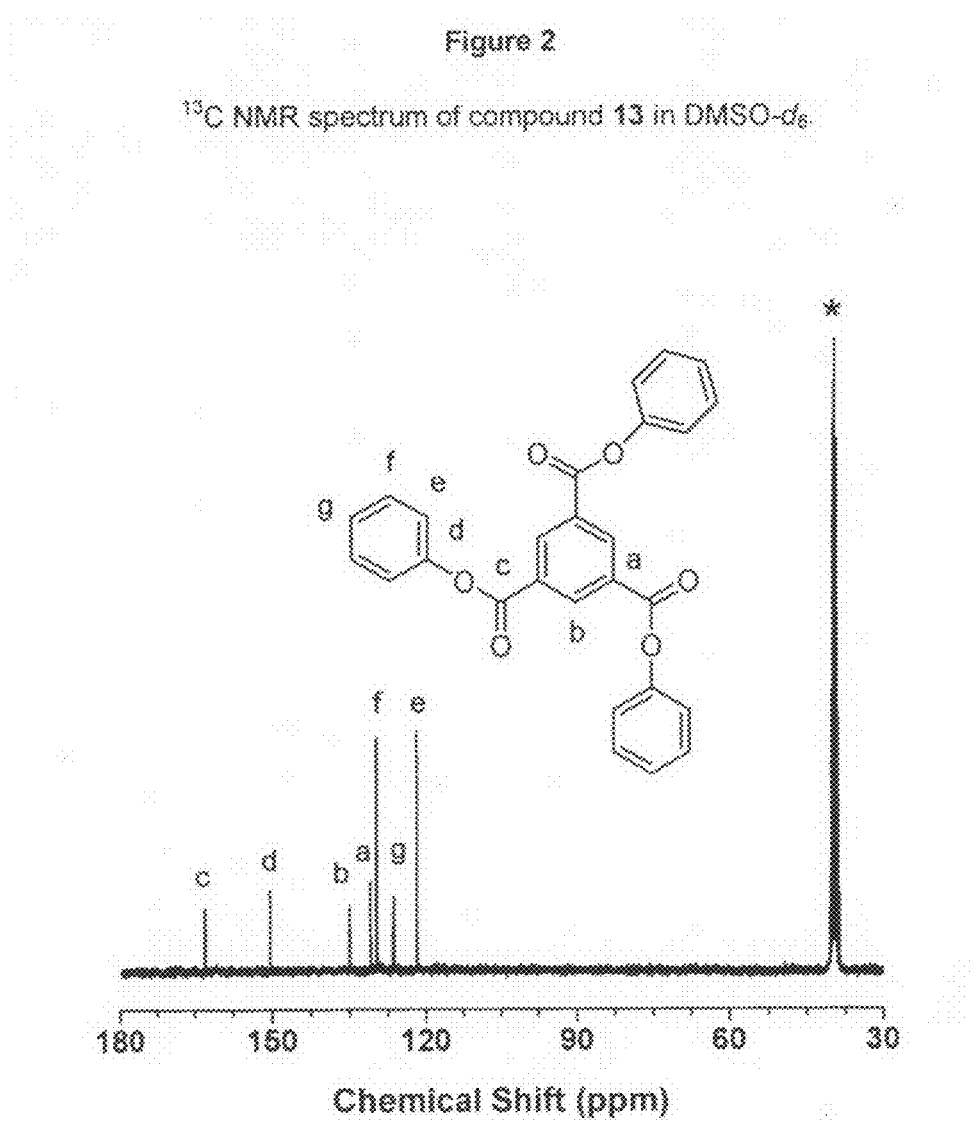
FIG. 2 shows a $^{13}$C NMR spectrum of triphenylbenzene-1,3,5-tricarboxylate (Compound 13) in DMSO-$d_6$.

The cyclotrimerized product 13 was investigated by standard spectroscopic analysis from which satisfactory data were obtained. FIG. 1 shows $^1$H NMR spectra of phenyl acetylenecarboxylate 12 and triphenyl benzene-1,3,5-tricarboxylate 13 in DMSO-$d_6$. In the spectra, phenyl acetylenecarboxylate 12 shows a strong acetylene resonance peak at $\delta$=4.97 ppm, which after cyclotrimerization completely disappears in the spectra of its cyclotrimerized product 13. At the same time, a new peak associated with the formation of the new benzene ring emerges at $\delta$=9.04 ppm. All the other peaks resulting from the attached phenyl moieties remain the same with no other peaks found, suggesting the successful conversion of the acetylenecarboxylate 12 to the cyclotrimerized product 13. Similar results have been obtained from $^{13}$C NMR spectra. All the peaks can be readily assigned to the expected structure of the cyclotrimerized product 13. FIG. 2 shows $^{13}$C NMR spectrum of triphenyl benzene-1,3,5-tricarboxylate 13 in DMSO-$d_6$.

Hyperbranched Polymers

The polymerized branched or hyperbranched polymers obtained according to the present invention comprise a plurality of end units and a plurality of internal units, said internal unit being of formula (I):

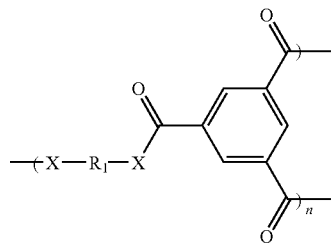

wherein X—$R_1$—X is a remainder of a diacylacetylene, X is O, NH or S; n is greater than 1, and said internal units have identical $R_1$ or different $R_1$. As a person with ordinary skill in the art would understand, in homopolymerization $R_1$ is identical in all the internal units of the polymers while in copolymerization $R_1$ may be different in other internal units because different starting diacylacetylenes with different $R_1$ are used. $R_1$ can be any organo or organometallic group that exists in a compound with at least two carbonylacetylene groups (diacylacetylenes) or a compound with one carbonylacetylene groups (monoacylacetylenes), which will become a capping unit in the polymers. Examples of preferred $R_1$ include those in P1, P2, P3, P4, and P5 in the following Chart 1. The plurality of end units represents either triple bonds from unreacted acetylene moieties or other organic groups from end-capping and/or functionalization agents. n preferably ranges from about 10 to about 100. The polymers obtained by the polymerization according to the present invention which is a simple one-pot reaction, are strictly regioselective, highly functionality-tolerant, and have a high degree of branching up to 100% in high yields up to 99%. The polymers are processible, easily film-forming, and transformable (curable) into thermosets by heat or irradiation.

A specific embodiment of the branched or hyperbranched polymers according to the present invention is illustrated in the following Chart 1 and 2.

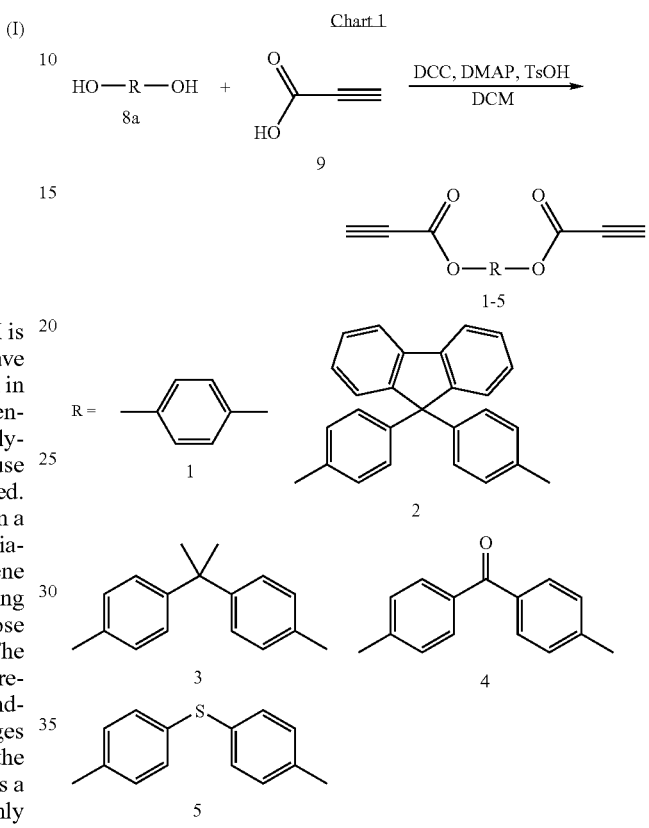

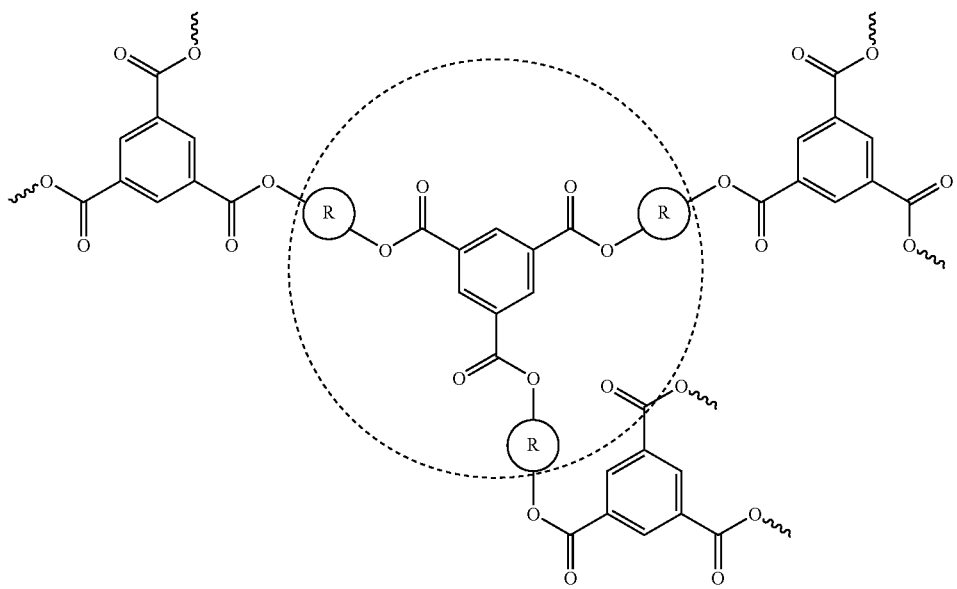

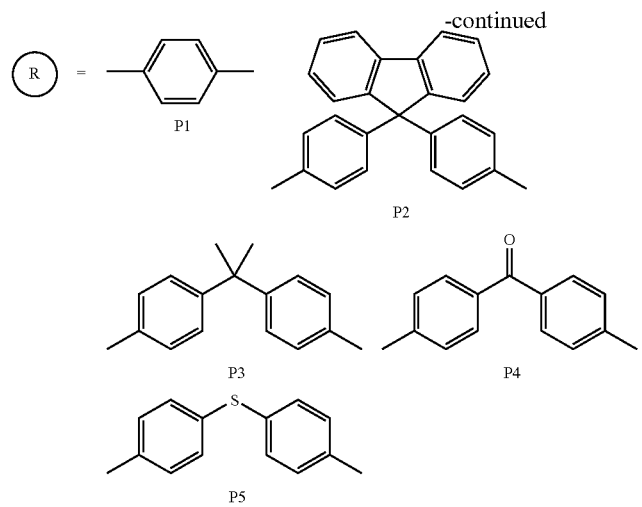

To prepare the branched or hyperbranched polymers, different diyne monomers are prepared first and then they are refluxed in DMF under different reaction conditions. The polymers are afterwards collected by precipitation into diethyl ether or methanol in the presence of a small amount of acid. The reaction conditions for the polycyclotrimerization of 2 are illustrated in the following Table 1.

TABLE 1

Polycyclotrimerization of 2

| Condition | t (h)[a] | Yield (%) | $M_w$[b] | PDI[c] |
|---|---|---|---|---|
| Piperidine in dioxane, $N_2$ | 24 | 50.1% | 3700 | 1.46 |
| Piperidine in dioxane, $N_2$ | 36 | 52.3% | 3600 | 1.64 |
| Piperidine in dioxane, $N_2$ | 60 | 60.8% | 8700 | 2.18 |
| DMF, $N_2$ | 20 | 54.6% | 8600 | 1.67 |
| DMF, $N_2$ | 24 | 65.9% | 13300 | 2.49 |
| DMF, air | 24 | 82.0% | 13220 | 1.90 |

[a]reaction time.
[b]Determined by GPC in THF on the basis of a polystyrene calibration.
[c]Polydispersity index.

To obtain hyperbranched polymer in high molecular weight, the polymerization conditions were optimized and the results are shown in Tables 2-5.

TABLE 2

Effect of Monomer Concentration on Polymerization of 3[a]

| Run | $[M_o]$ (M) | yield (%) | S[b] | $M_w$[c] | $M_w/M_n$[c] |
|---|---|---|---|---|---|
| 1 | 0.120 | 51.7 | ✓ | 14 200 | 2.5 |
| 2 | 0.178 | 68.4 | ✓ | 15 600 | 2.4 |
| 3 | 0.267 | 44.8 | ✓ | 15 200 | 2.6 |
| 4 | 0.534 | 37.5 | ✓ | 15 800 | 2.8 |

[a]Reflux in DMF for 24 h under nitrogen.
[b]Solubility (S) tested in common organic solvents such as toluene, DCM, chloroform and THF: ✓ = completely soluble.
[c]Determined by GPC in THF on the basis of a linear polystyrene calibration.

TABLE 3

Time Course of Polymerization of 3[a]

| Run | t (h)[b] | yield (%) | S[c] | $M_w$[d] | $M_w/M_n$[d] |
|---|---|---|---|---|---|
| 1 | 6 | 19.7 | ✓ | 5 400 | 1.3 |
| 2 | 12 | 22.1 | ✓ | 7 200 | 1.6 |
| 3 | 18 | 55.8 | ✓ | 14 200 | 2.3 |
| 4 | 24 | 71.3 | ✓ | 13 800 | 2.9 |
| 5 | 36 | 71.2 | ✓ | 10 200 | 2.5 |

[a]Reflux in DMF under nitrogen, $[M_o]$ = 0.178 M.
[b]t = Reaction time.
[c]Solubility (S) tested in common organic solvents such as toluene, DCM, chloroform and THF: ✓ = completely soluble.
[d]Determined by GPC in THF on the basis of a linear polystyrene calibration.

TABLE 4

Effect on the presence of air on Polymerization of 3[a]

| Run | condition | yield (%) | S[b] | $M_w$[c] | $M_w/M_n$[c] |
|---|---|---|---|---|---|
| 1 | $N_2$ | 71.6 | ✓ | 12 800 | 2.9 |
| 2 | air | 72.3 | ✓ | 13 000 | 3.1 |

[a]Carried out in DMF for 24 h under nitrogen; $[M_o]$ = 0.178 M.
[b]Solubility (S) tested in common organic solvents such as toluene, DCM, chloroform and THF: ✓ = completely soluble.
[c]Determined by GPC in THF on the basis of a linear polystyrene calibration.

TABLE 5

Result of Polymerization of 3[a]

| Run | T (° C.)[b] | yield (%) | S[c] | $M_w$[d] | $M_w/M_n$[d] |
|---|---|---|---|---|---|
| 1 | 110 | 7.1 | ✓ | 5 400 | 1.5 |
| 2 | 130 | 17.5 | ✓ | 6 300 | 1.5 |
| 3 | reflux | 68.4 | ✓ | 11 100 | 2.4 |

[a]Carried out in DMF for 24 h under nitrogen; $[M_o]$ = 0.178 M.
[b]T = Reaction temperature.
[c]Solubility (S) tested in common organic solvents such as toluene, DCM, chloroform and THF: ✓ = completely soluble.
[d]Determined by GPC in THF on the basis of a linear polystyrene calibration.

TABLE 6

Optimal Conditions for the polycyclotrimerization of 3

| Solvent | T (° C.) | t (h) | $[M_o]$ (M) |
|---|---|---|---|
| DMF | reflux | 24 | 0.178 |

After optimization of reaction condition, the polymerizations of compounds 1 to 5 are carried out and the polymerization results are given in Table 7.

TABLE 7

Polymerization results of Arylene Bispropiolates 1-5[a]

| run | monomer | yield (%) | S[b] | $M_w$[c] | $M_w/M_n$[c] |
|---|---|---|---|---|---|
| 1 | 1 | 84.0 | x | | |
| 2 | 2 | 73.2 | ✓ | 14 600 | 3.9 |
| 3[d] | 3 | 68.4 | ✓ | 15 600 | 2.4 |
| 4 | 4 | 65.9 | Δ | | |
| 5 | 5 | 81.7 | ✓ | 5 200 | 1.6 |

[a]Carried out in DMF for 24 h under nitrogen; [M$_o$] = 0.178 M.
[b]Solubility (S) tested in common organic solvents such as toluene, DCM, chloroform and THF: ✓ = completely soluble, Δ = partially soluble, x = insoluble.
[c]Determined by GPC in THF on the basis of a linear polystyrene calibration.
[d]Data taken from Table 2, no. 2.

Figure 3:
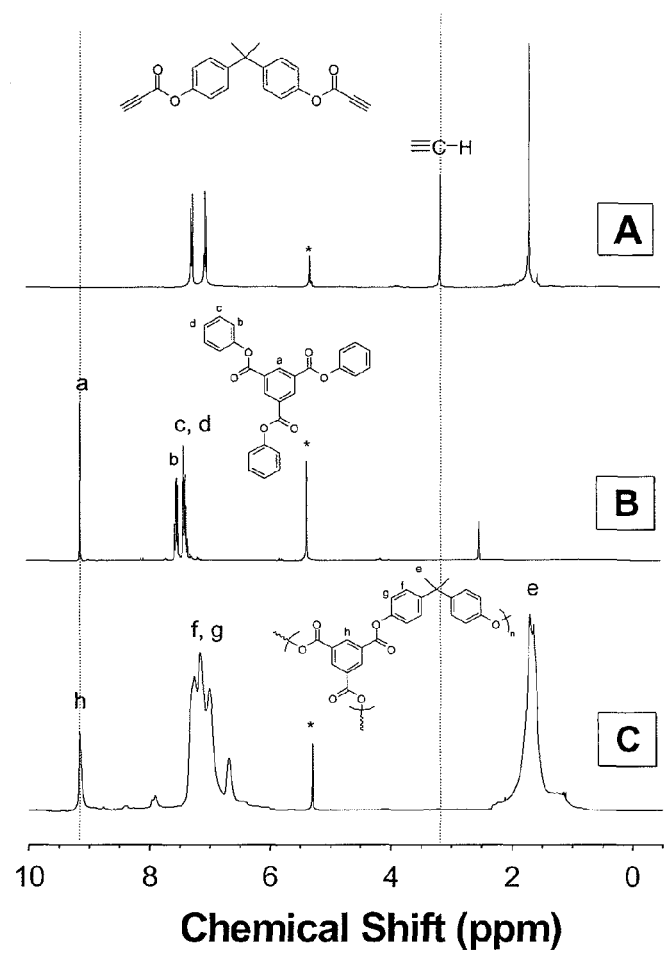
FIG. 3 shows $^1$H NMR spectra of (A) monomer 3, (B) model compound 13, and (C) hb-P3 in dichloromethane-$d_2$. The solvent peaks are marked with asterisks (*).
Figure 4:
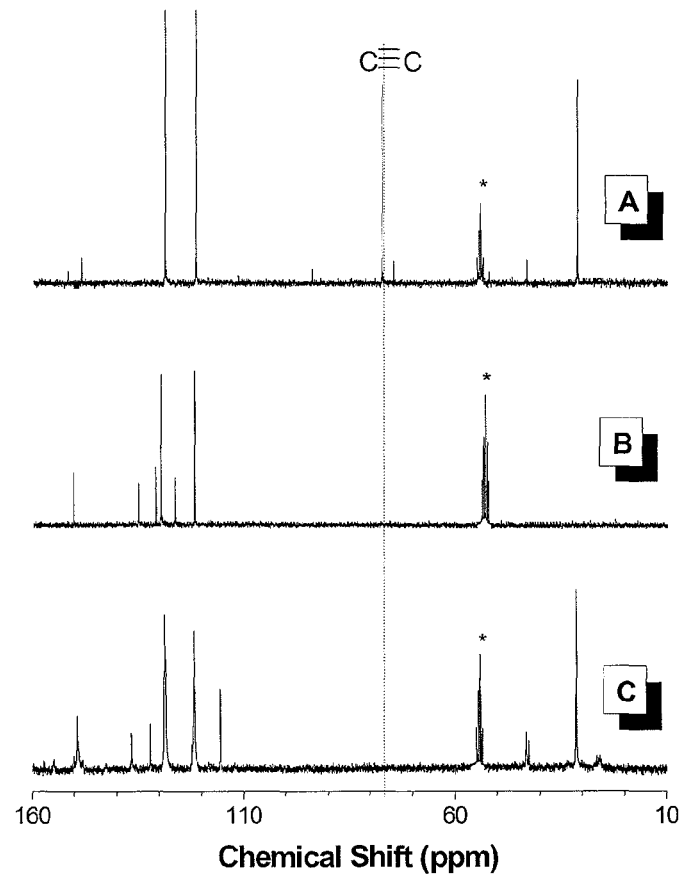
FIG. 4 shows $^{13}$C NMR spectra of (A) monomer 3, (B) model compound 13, and (C) hb-P3 in dichloromethane-$d_2$. The solvent peaks are marked with asterisks (*).
Figure 5:
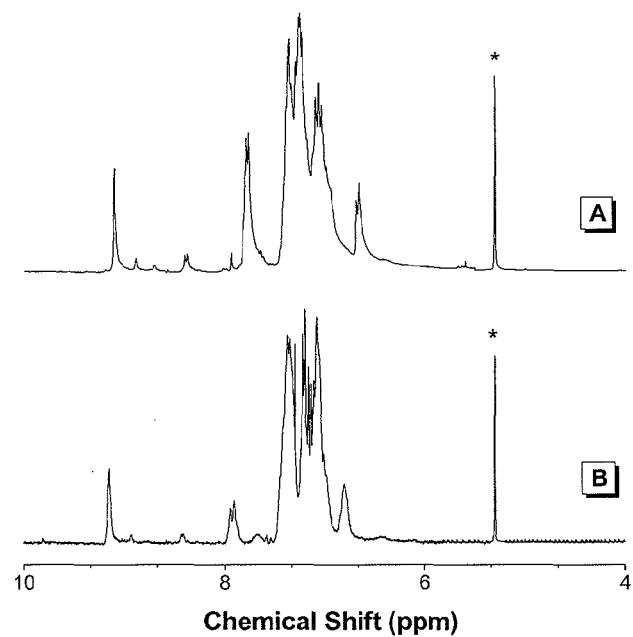
FIG. 5 shows $^1$H NMR spectra of (A) hb-P2, (B) hb-P5 in dichloromethane-$d_2$. The solvent peaks are marked with asterisks (*).
Figure 6:
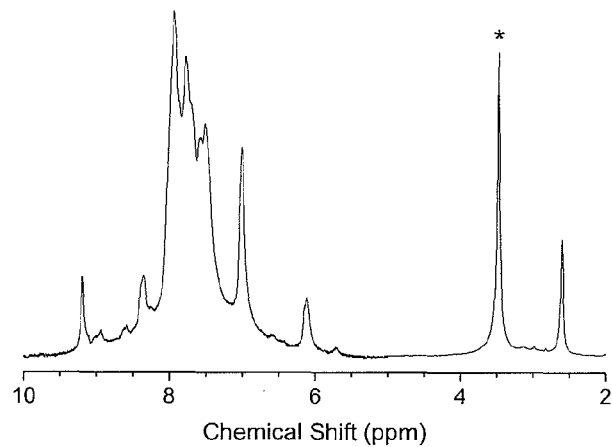
FIG. 6 shows $^1$H NMR spectrum of hb-P4 in DMSO-$d_6$. The solvent peaks are marked with asterisks (*).
Figure 7:
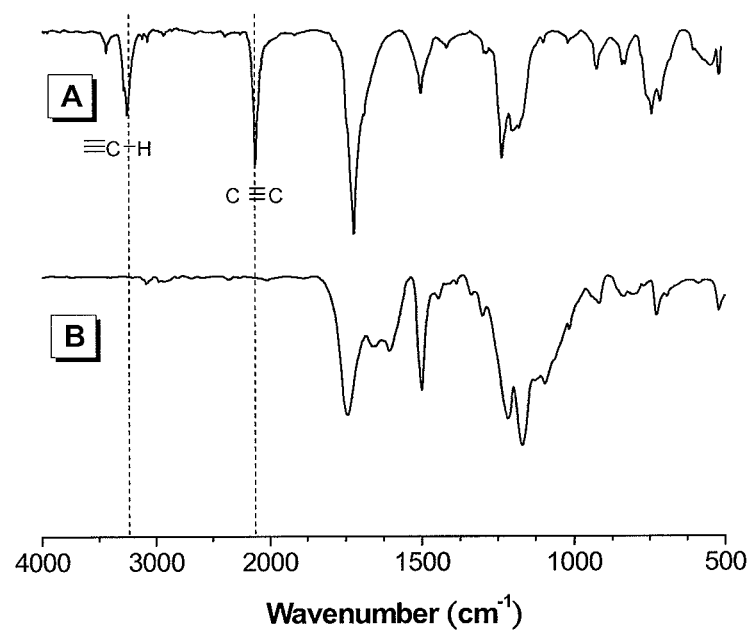
FIG. 7 shows IR spectra of (A) monomer 1 and (B) its polymer hb-P1.
Figure 8:
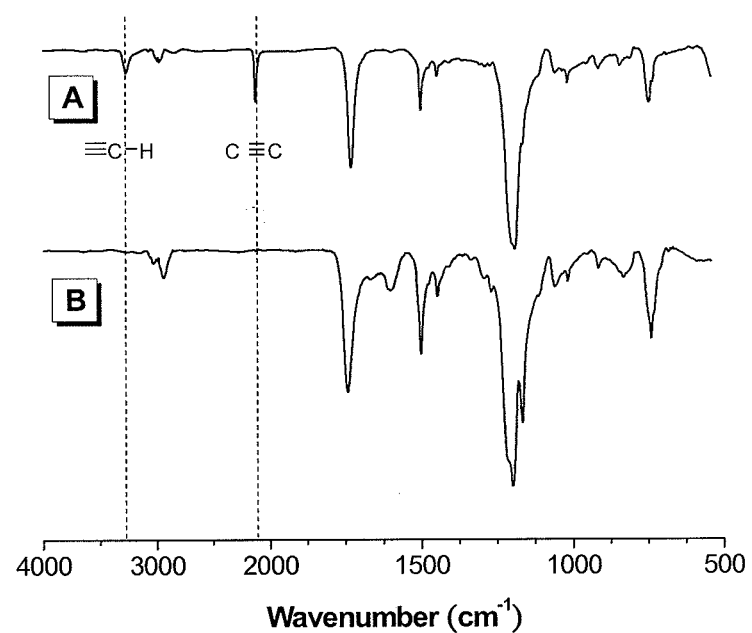
FIG. 8 shows IR spectra of (A) monomer 2 and (B) its polymer hb-P2.
Figure 9:
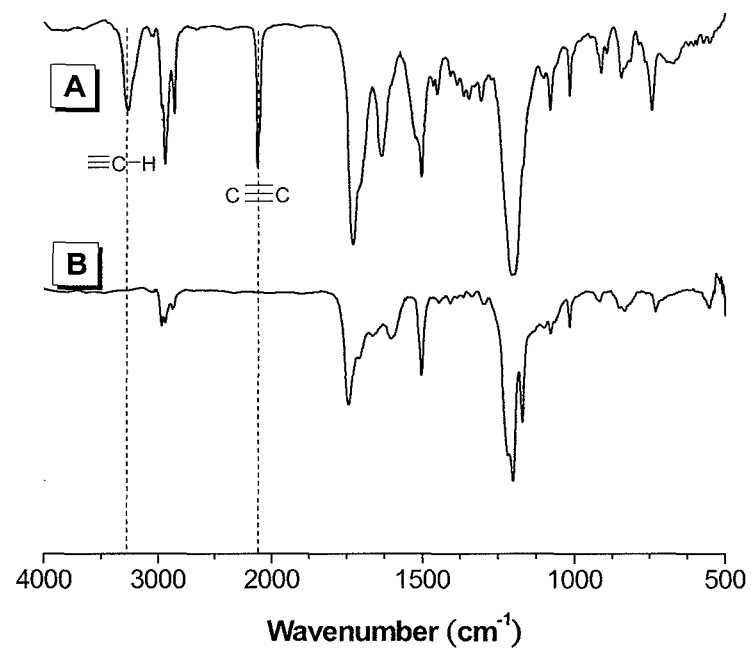
FIG. 9 shows IR spectra of (A) monomer 3 and (B) its polymer hb-P3.
Figure 10:
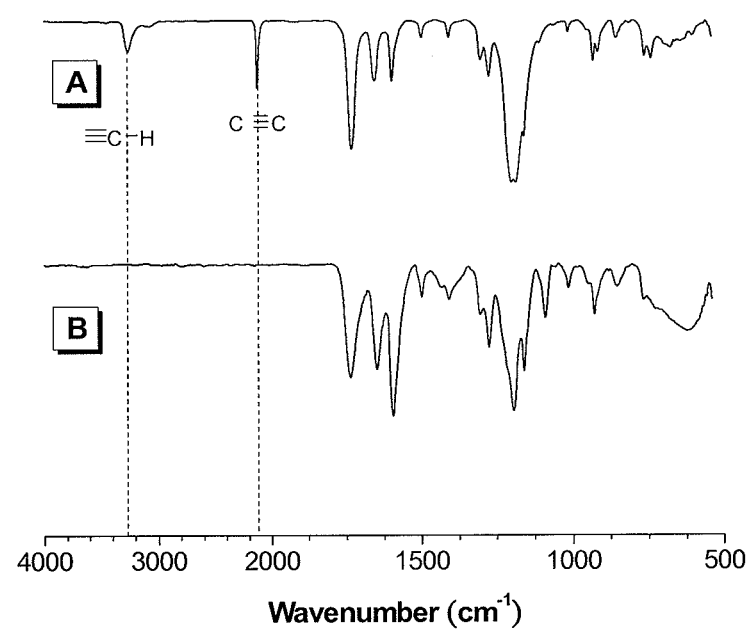
FIG. 10 shows IR spectra of (A) monomer 4 and (B) its polymer hb-P4.
Figure 11:
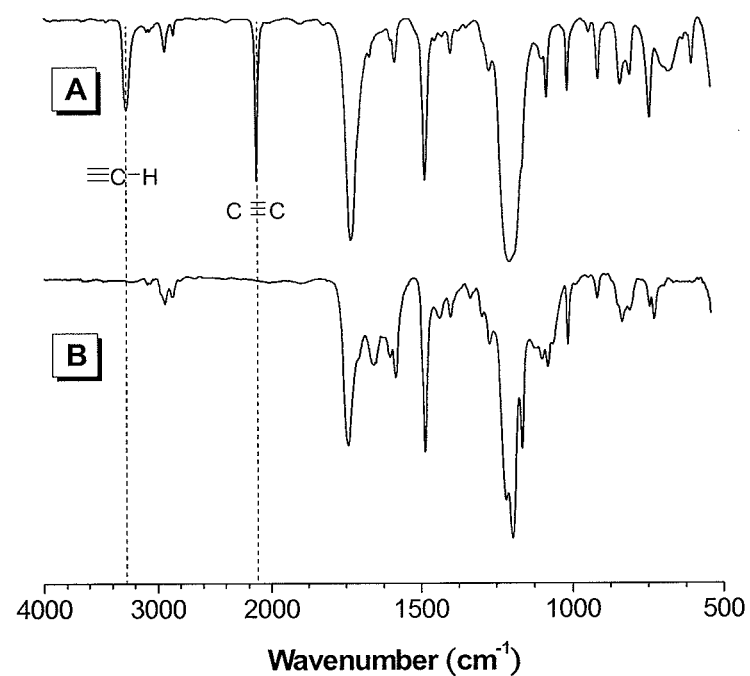
FIG. 11 shows IR spectra of (A) monomer 5 and (B) its polymer hb-P5.

Variation in the synthetic procedure of the hyperbranched polymer P2 gives similar spectroscopic results, suggesting that the use of catalyst does not have much effect on the structure of the hyperbranched polymer and it only affects the molecular weight as seen in Table 1. FIG. 3 shows the $^1$H NMR spectra of hyperbranched poly[(dimethyl)methylenedi (1,4-phenylene) bipropiolate] (P3), its monomer (3) and the model cyclotrimerized product 13 in dichloromethane-d$_2$. A new peak at δ ~9.3 ppm associated with the proton of the cyclotrimerized benzene emerges in the spectrum of the polymer. The position of this peak matches with the peak from the cyclotrimerized product 13. Furthermore, almost no triple bond moieties can be detected in the spectra of the polymers after polycyclotrimerization, suggesting a high conversion of the functional groups and thus a high degree of polymerization. From the $^{13}$C NMR spectra of the hyperbranched polymer hb-P3, its corresponding monomer 3 and the model cyclotrimerized product 13 in dichloromethane-d$_2$, the peak at δ ~75 ppm which represent the triple bond, disappears after cyclotrimerization, confirmed that the high conversion of the functional groups and the high degree of branching of the resulting polymer. The variation of reaction condition from nitrogen to air does not have much effect on the structure and the molecular weight of the hyperbranched polymer, that means the presence of oxygen do not interrupt the process of polymerization.

The hyperbranched polymer structures are further investigated by IR spectroscopy. FIG. 7-11 shows the IR spectra of the hyperbranched polymers and their corresponding monomers. The peaks at ~3100 cm$^{-1}$ and ~2000 cm$^{-1}$, associated with the ≡C—H and C≡C stretching respectively, of the polymers disappear after polymerization. The spectroscopic results are in full agreement with their expected branched structure.

Figure 12:
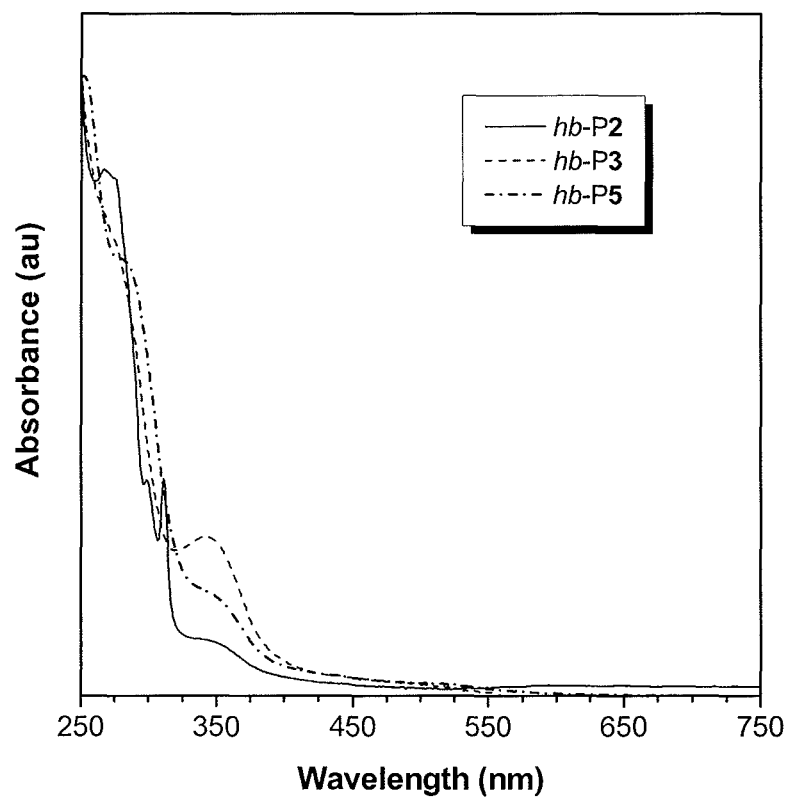
FIG. 12 shows UV absorption spectra of THF solutions of hb-P2, hb-P3, and hb-P5.

FIG. 12 shows UV spectra of the hyperbranched polymers hb-P2, hb-P3 and hb-P5 in THF solution (2×10$^{-5}$M). All polymers exhibit strong UV absorption originating from their incorporated chromophoric units, with their cut-off wavelength at <400 nm. The polymers are thus highly transparent in the visible region. Furthermore, low fluorescence has been observed.

Figure 13:
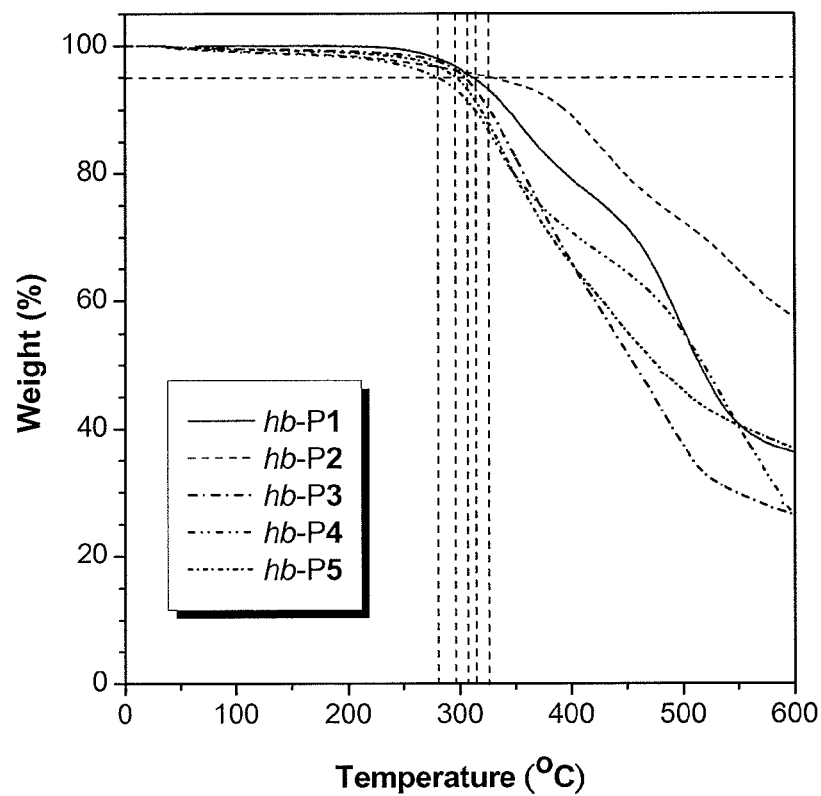
FIG. 13 shows a TGA thermogram of hyperbranched poly (aroxycarbonylphenylene)s hb-P1-P5 recorded under nitrogen at a heating rate of 20° C./min.

The stability of the polymers has been evaluated by thermogravimetric analysis. FIG. 13 shows TGA thermograms of the hyperbranched polymers P1 to P5 recorded under nitrogen at a heating rate of 20° C./min. All the polymers are very thermally stable and start to degrade only at temperatures above 300° C. Accordingly, the polymers can be quantitatively converted into thermoset by heating to ~200° C.

Figure 14:
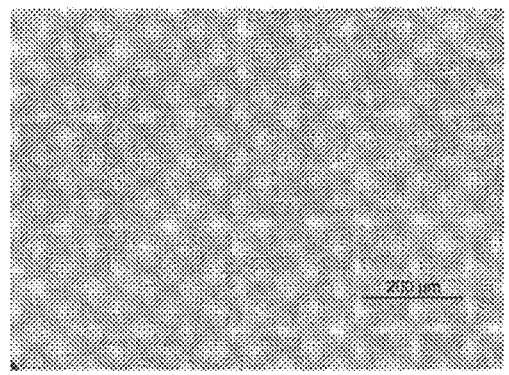
FIG. 14 shows a negative pattern generated by photolithography of hb-P3.

The polymers contain many triacylarylene, or triacylbenzene units and thus show high photocrosslinking efficiencies. FIG. 14 shows a negative pattern generated from photolithography of hb-P3. The polymer shows good film forming ability. Photo-patterns with fine structures of the polymer have been successfully generated.

Figure 15:
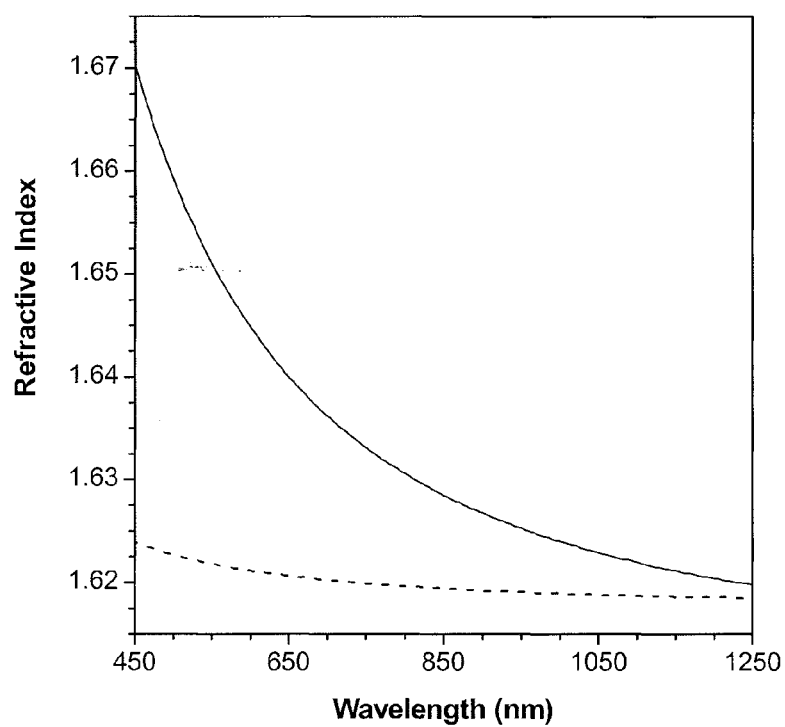
FIG. 15 shows wavelength dependence of refractive index of a thin film of hb-P3 before (dash line) and after UV irridation for 30 min (solid line).

The refractive index of the hyperbranched polymer has been investigated. The wavelength dependent refractive index of hb-P3 was investigated, too. Afterward, the polymer film is irradiated by a UV lamp for 30 mins and the refractive index of the polymer film was checked again. The results are shown in FIG. 15. After UV irradiation, the refractive index of polymer increased at the low wavelength side.

The present invention for the first time provides for the cyclotrimerization of acylarylene in the absence of metal to be used to prepare processible poly(acylarylene)s by polycyclotrimerization. This new cyclotrimerization is easy and low cost and the absence of metal in the synthesis process makes the product more "green" and applicable for optical innovations. In addition, the preparation of the monomer and the polymerization are both simple, the obtained polymer is strictly regioselective, and highly functionality-tolerant. Such highly branched materials are advantageous over common linear polymers in many different ways such as high processibility, high functional end group density, low solution and intrinsic viscosity and thermal stability.

Various functional groups can be introduced into hyperbranched poly(acylarylene)s, which may have a variety of applications for optical (light-emitting polymers, hole- or electron-transport materials, optical limiters), thermal (curable films, thermosets, adhesives), electronic (negative resist) and magnetic devices. Accordingly, the polymers of the present invention may be used to make a hybrid-polymer by incorporating metallic species into the (co)polymers. The formation of such hybrid structures will lead to high metal-loaded organometallic polymers with interesting catalytic, electrical and/or magnetic properties. Upon pyrolysis at elevated temperatures, the patterned hybrid-polymers are transformable into ferromagnetic ceramic patterns with high char yields and resolutions.

EXAMPLES

Some embodiments of the present invention will be described below in further detail with reference to the examples, but the present invention is not intended to be limited to these examples.

Example 1

Hyperbranched poly[1,4-phenylene dipropiolate] P1

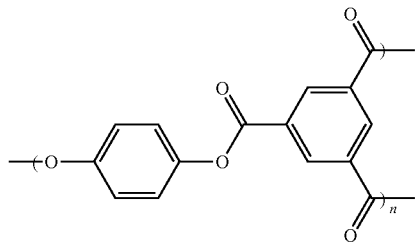

In a 15 mL Schlenk tube equipped with a three-way stopcock on the sidearm was placed 57 mg of 1,4-phenylene dipropiolate (0.267 mmol) under nitrogen in a glovebox. Distilled DMF (1.5 mL) was injected into the tube using a hypodermic syringe. The mixture was stirred under reflux for 24 h. Afterwards, the polymerization mixture was added dropwise to ~300 mL methanol containing a small amount of diluted hydrochloric acid through a cotton filter. The precipitate of the polymer was allowed to stand overnight and was then collected by filtration. The isolated polymer was washed with methanol and dried under vacuum at room temperature to a constant weight.

Characterization data: Brown power, yield: 84.0%. IR (KBr), v (cm$^{-1}$): 3079, 2930, 1744, 1651, 1604, 1500, 1444.

Example 2

Hyperbranched poly[4,4'-(9H-fluorene-9,9-diyl)bis(4,1-phenylene) dipropiolate] P2-pip

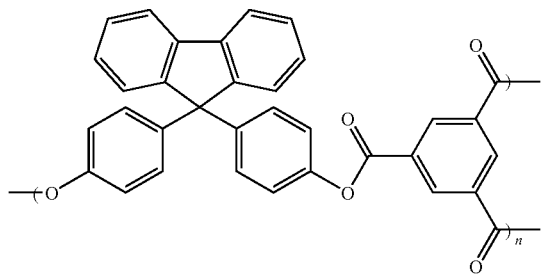

In a 15 mL Schlenk tube equipped with a three-way stopcock on the sidearm was placed 120 mg of 4,4'-(9H-fluorene-9,9-diyl)bis(4,1-phenylene) dipropiolate (0.267 mmol) under nitrogen in a glovebox. Distilled dioxane (1.9 mL) and piperidine (0.3 mL) in dioxane (0.3 M) were injected into the tube using a hypodermic syringe. The mixture was stirred under reflux for 24 h. Afterwards, the polymerization mixture was added dropwise to ~300 mL diethyl ether through a cotton filter. The precipitate of the polymer was allowed to stand overnight and was then collected by filtration. The isolated polymer was washed with diethyl ether and dried under vacuum at room temperature to a constant weight.

Characterization data: Brown power, yield: 50.1%. $M_w$: 3700, $M_w/M_n$: 1.46 (GPC, polystyrene calibration). IR (thin film), v (cm$^{-1}$): 3017, 2941, 2858, 2125, 1740, 1703.

Example 3

Hyperbranched poly[4,4'-(9H-fluorene-9,9-diyl)bis(4,1-phenylene) dipropiolate] P2-DMF,N$_2$ and P2-DMF,air

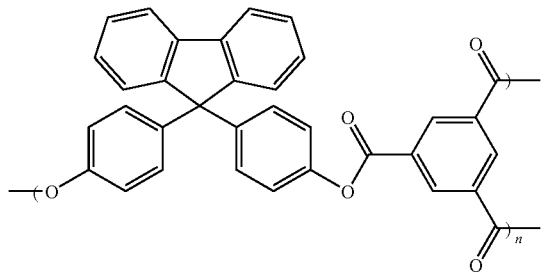

In a 15 mL Schlenk tube equipped with a three-way stopcock on the sidearm was placed 120 mg of 4,4'-(9H-fluorene-9,9-diyl)bis(4,1-phenylene) dipropiolate (0.267 mmol) under nitrogen in a glovebox. Distilled DMF (1.5 mL) was injected into the tube using a hypodermic syringe. The mixture was stirred under reflux for 24 h. Afterwards, the polymerization mixture was added dropwise to ~300 mL methanol containing a small amount of diluted hydrochloric acid through a cotton filter. The precipitate of the polymer was allowed to stand overnight and was then collected by filtration. The isolated polymer was washed with methanol and dried under vacuum at room temperature to a constant weight.

Characterization data: Brown power, yield: 65.9%. $M_w$: 13300, $M_w/M_n$: 2.49 (GPC, polystyrene calibration). IR (thin film), v (cm$^{-1}$): 3017, 2941, 2858, 2125, 1740, 1703. $^1$H NMR (300 MHz in DCM-d$_2$): 9.15, 7.78, 7.77, 7.37, 7.30, 7.26, 7.23, 7.07, 6.99, 6.94, 6.67. $^{13}$C NMR (75 MHz in DCM-d$_2$): 164.3, 164.1, 155.6, 151.9, 151.4, 150.3, 140.8, 136.6, 131.9, 130.0, 128.6, 128.4, 126.8, 122.2, 122.0, 121.0, 115.8.

Same procedure was repeated for P2-DMF, air with the reaction atmosphere in air instead of nitrogen. Characterization data: Brown power, yield: 82.0%. $M_w$: 14 600, $M_w/M_n$: 3.9 (GPC, polystyrene calibration). IR (thin film), v (cm$^{-1}$): 3013, 2939, 2859, 2125, 1743, 1602. $^1$H NMR (300 MHz in DCM-d$_2$): 9.10, 7.79, 7.76, 7.37, 7.34, 7.27, 7.23, 7.09, 7.07, 7.04, 6.95, 6.93, 6.66. $^{13}$C NMR (75 MHz in DCM-d$_2$): 164.7, 163.9, 155.9, 152.0, 151.9, 151.2, 150.1, 149.9, 144.4, 140.6, 140.5, 137.5, 136.4, 131.7, 130.8, 129.8, 129.5, 128.4, 126.6, 122.5, 121.8, 120.8, 115.7, 65.2, 64.9.

Example 4

Hyperbranched poly[(Dimethyl)methylenedi(1,4-phenylene) bipropiolate] P3

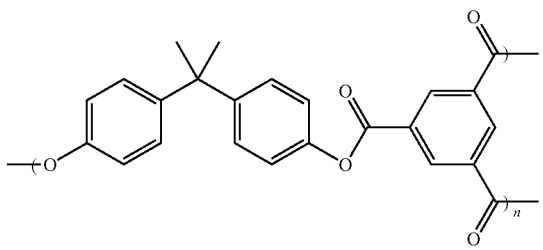

In a 15 mL Schlenk tube equipped with a three-way stopcock on the sidearm was placed 89 mg of (dimethyl)methylenedi(1,4-phenylene) bipropiolate (0.267 mmol) under nitrogen in a glovebox. Distilled DMF (1.5 mL) was injected into the tube using a hypodermic syringe. The mixture was stirred under reflux for 24 h. Afterwards, the polymerization mixture was added dropwise to ~300 mL methanol containing a small amount of diluted hydrochloric acid through a cotton filter. The precipitate of the polymer was allowed to stand overnight and was then collected by filtration. The isolated polymer was washed with methanol and dried under vacuum at room temperature to a constant weight.

Characterization data: Brown power, yield: 68.4%. $M_w$: 15600, $M_w/M_n$: 2.4 (GPC, polystyrene calibration). IR (thin film), v (cm$^{-1}$): 2966, 2933, 2872, 1742, 1603, 1504. $^1$H NMR (300 MHz in DCM-d$_2$): 9.16, 7.96, 9.91, 7.27, 7.17, 7.101, 1.70, 1.65. $^{13}$C NMR (75 MHz in DCM-d$_2$): 164.3, 149.3, 136.5, 132.0, 128.7, 128.5, 121.8, 121.6, 115.5, 43.2, 31.4.

Example 5

Hyperbranched poly[4,4'-carbonylbis(4,1-phenylene) dipropiolate] P4

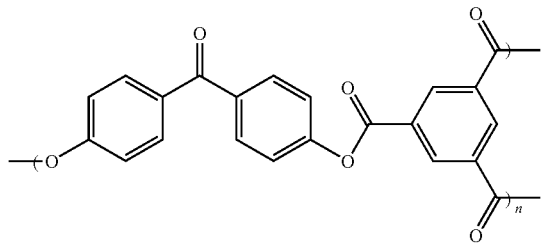

In a 15 mL Schlenk tube equipped with a three-way stopcock on the sidearm was placed 85 mg of 4,4'-carbonylbis(4,1-phenylene) dipropiolate (0.267 mmol) under nitrogen in a glovebox. Distilled DMF (1.5 mL) was injected into the tube using a hypodermic syringe. The mixture was stirred under reflux for 24 h. Afterwards, the polymerization mixture was added dropwise to ~300 mL methanol containing a small amount of diluted hydrochloric acid through a cotton filter. The precipitate of the polymer was allowed to stand overnight and was then collected by filtration. The isolated polymer was washed with methanol and dried under vacuum at room temperature to a constant weight.

Characterization data: Brown power, yield: 65.9%. The polymer is not very soluble in THF, so we have not collect its GPC data. IR (thin film), v (cm$^{-1}$): 3019, 1922, 1737, 1595. $^1$H NMR (300 MHz in DMSO-d$_6$): 10.57, 9.19, 8.36, 7.90, 7.78, 7.57, 7.52, 7.00. $^{13}$C NMR (75 MHz in DMSO-d$_6$): 193.2, 171.0, 164.3, 162.6, 161.9, 158.6, 153.6, 136.1, 134.3, 132.5, 131.3, 130.8, 127.8, 121.2, 117.6, 115.2.

Example 6

Hyperbranched poly[4,4'-thiobis(4,1-phenylene) dipropiolate] P5

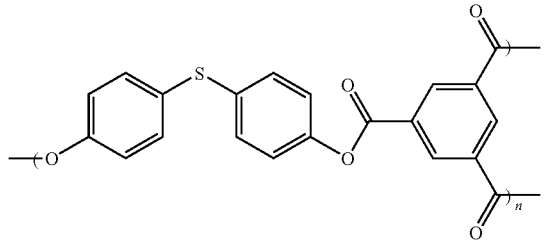

In a 15 mL Schlenk tube equipped with a three-way stopcock on the sidearm was placed 86 mg of 4,4'-thiobis(4,1-phenylene) dipropiolate (0.267 mmol) under nitrogen in a glovebox. Distilled DMF (1.5 mL) was injected into the tube using a hypodermic syringe. The mixture was stirred under reflux for 24 h. Afterwards, the polymerization mixture was added dropwise to ~300 mL diethyl ether containing a small amount of acetic acid through a cotton filter. The precipitate of the polymer was allowed to stand overnight and was then collected by filtration. The isolated polymer was washed with diethyl ether and dried under vacuum at room temperature to a constant weight.

Characterization data: Brown power, 81.7%. M$_w$: 5600, M$_w$/M$_n$: 1.6 (GPC, polystyrene calibration). IR (thin film), v (cm$^{-1}$): 2932, 1741, 1655, 1582, 1486. $^1$H NMR (300 MHz in DCM-d$_2$): 9.15, 7.94, 7.37, 7.35, 7.30, 7.24, 7.22, 7.16, 7.14, 7.11, 7.08, 7.01, 6.80. $^{13}$C NMR (75 MHz in DCM-d$_2$): 163.9, 136.7, 133.0, 129.7, 123.3, 119.8, 119.2, 117.3.

Example 7

Forming a Negative Patterning Employing hb-P3

A thin film of hb-P3 coated on silicon wafers was irradiated with a UV light (365 nm) for 20 min through a copper negative photomask. The exposed region of the film was cross-linked and hence insoluble. After the film was developed with 1,2-dichloroethane, a negative photoresist pattern was generated. The high quality of the pattern (sharp line edges, uniform film thickness, etc.) was clearly seen under the normal laboratory lighting. This pattern is shown in FIG. 14.

In the foregoing description of the invention, there is no intention to be bound by any expressed or implied theory presented in explaining the properties of the polymers of the present invention.

While there have been described and pointed out fundamental novel features of the invention as applied to a preferred embodiment thereof, it will be understood that various omissions and substitutions and changes, in the form and details of the embodiments illustrated, may be made by those skilled in the art without departing from the spirit of the invention. The invention is not limited by the embodiments described above which are presented as examples only but can be modified in various ways within the scope of protection defined by the appended patent claims.

What is claimed is:

1. A polymer, comprising a plurality of end units and a plurality of internal units, said internal unit being of formula (I)

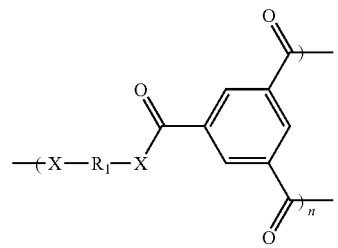

(I)

wherein X-R$_1$-X is a remainder of a diacylacetylene, X is O, NH or S, n 1 ranges from 1 to 100, and said internal units have identical R$_1$ or different R$_1$.

2. The polymer of claim 1, wherein X is O.

3. The polymer of claim 1, wherein R$_1$ is the same in all said internal units.

4. The polymer of claim 1, wherein R$_1$ is independently selected from the group consisting of:

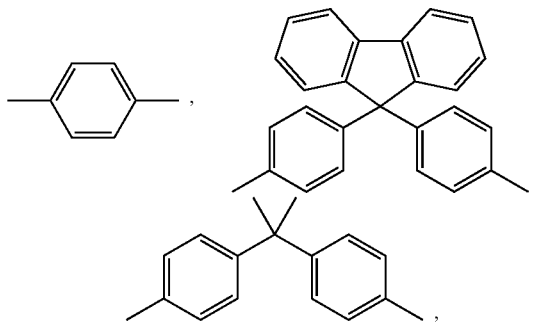

-continued

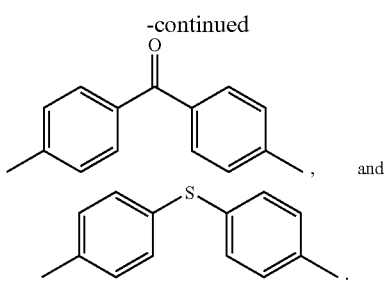

5. A method for the preparation of triacylbenzenes having the formula (II) or polymers thereof, which comprises the following cyclotrimerization reaction step:

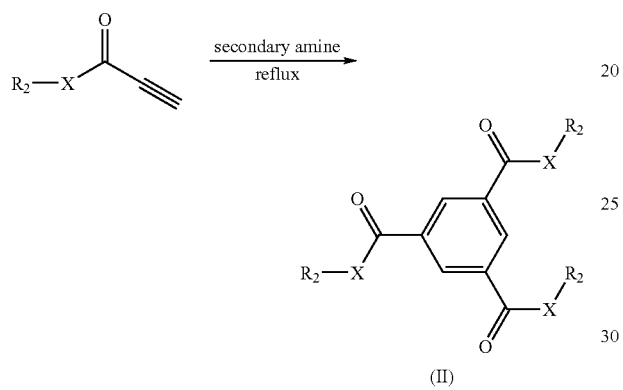

wherein $R_2$ is selected from any organo or organometallic groups, X is O, NH, or S, and $R_2$ in the formula (II) is identical or different.

6. The method of claim 5, wherein the cyclotrimerization is accomplished in the absence of metal.

7. The method of claim 5, wherein X is O.

8. The method of claim 5, wherein $R_2$ is selected from the group consisting of:

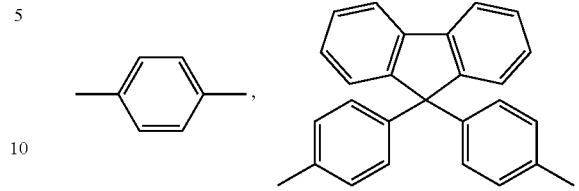

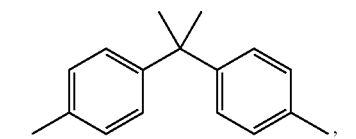

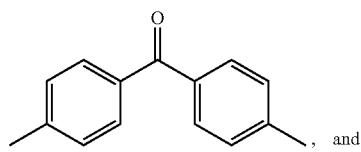

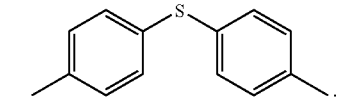

9. The method of claim 5, wherein the polymer has the following formula:

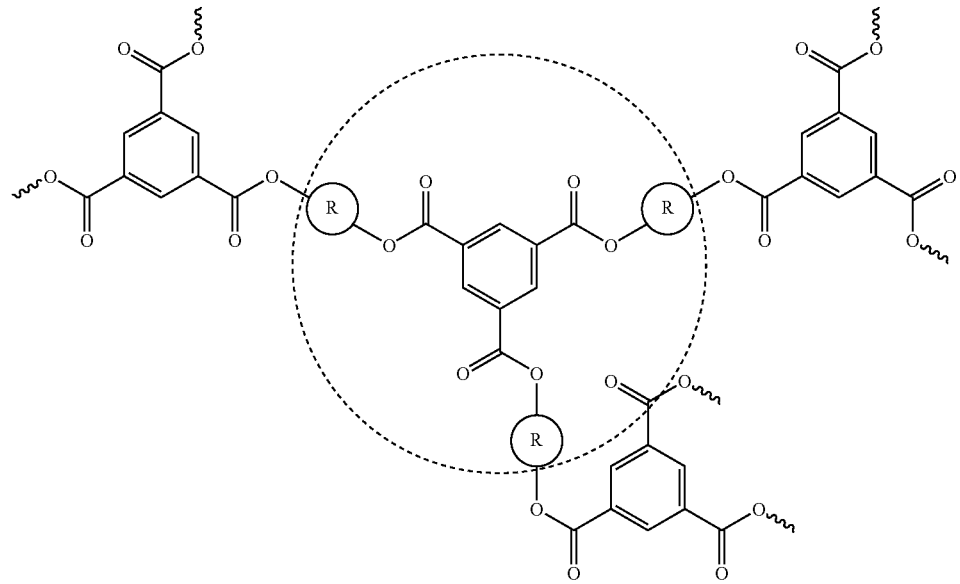

wherein ⌇ indicates a polymer branch, and Ⓡ has the same definition as $R_2$.

10. The method of claim 9, wherein Ⓡ is selected from the group consisting of:

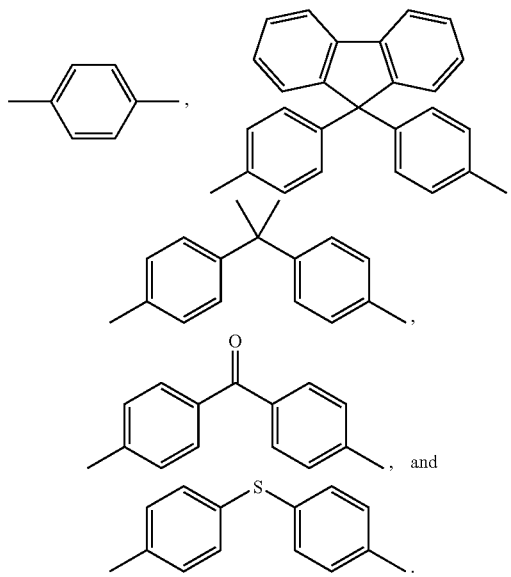

11. The method of claim 5, wherein the polymerization is conducted for at least 20 hours to up to 60 hours.

12. The method of claim 5, wherein the secondary amine is selected from the group consisting of dimethylformamide (DMF), piperidine, diethylamine, diphenylamine, N,N-Diisopropylethylamine (DIPEA), 1,8-Diazabicycloundec-7-ene (DBU).

13. The method of claim 12, wherein the secondary amine is dimethylformamide (DMF).

14. The method of claim 13, wherein the polymerization is conducted under $N_2$ or in air.

15. The method of claim 5, wherein the polymerization is conducted by refluxing with piperidine in dioxane.

16. A method for the preparation of a polymer of claim 1, comprising the following polymerization step:

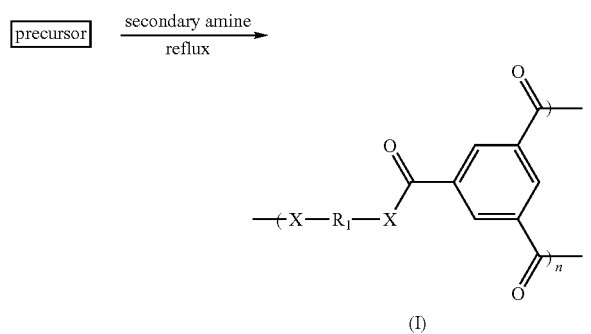

wherein said precursor comprises one or more diacylacetylenes, X-$R_1$-X is a remainder of the diacylacetylenes, X is O, NH or S, n is greater than 1, and said $R_1$ in the formula (I) is identical to or different from each other.

17. The method of claim 16, wherein the polymerization is conducted in the absence of metal.

18. The method of claim 16, wherein said precursor comprises one or more diacylacetylenes of the following formula (III):

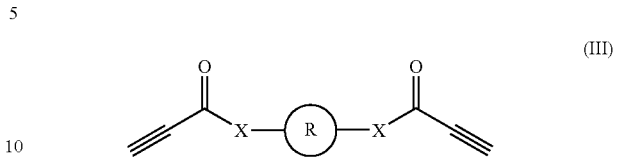

wherein Ⓡ is any one selected from the group consisting of:

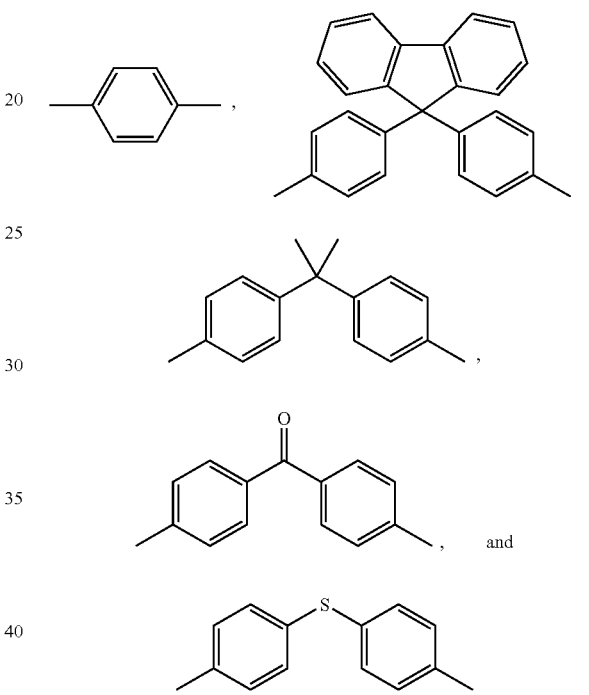

and X is O, NH or S.

19. The method of claim 16, wherein X is O.

20. The method of claim 18, wherein the diacylacetylene of formula (III) is prepared by the condensation reaction between any organic or organometallic compound of the following formula (IV) and propiolic acid of the following formula (V):

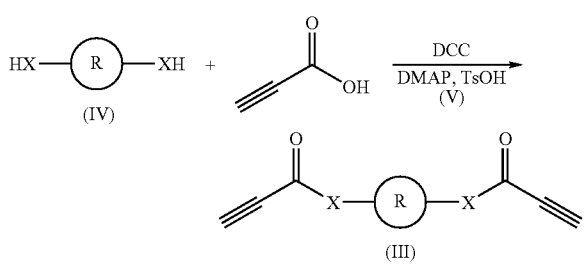

wherein Ⓡ is selected from any organo or organometallic group, and X is O, NH or S.

21. The method of claim 16, wherein $R_1$ is the same in all internal units of formula (I).

22. The method of claim 16, wherein $R_1$ independently is selected from the group consisting of:

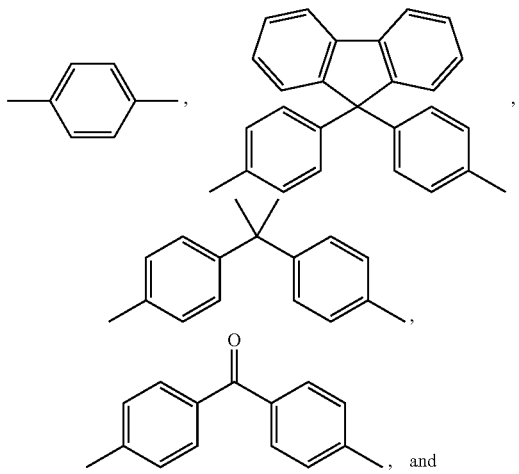

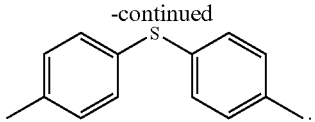

23. The method of claim 16, wherein said precursor further comprises one or more monoynes for end-capping of said polymer.

24. The method of claim 16, wherein the polymerization is conducted for at least 20 hours to up to 60 hours.

25. The method of claim 16, wherein the secondary amine is selected from the group consisting of dimethylformamide (DMF), piperidine, diethylamine, diphenylamine, N,N-Di-isopropylethylamine (DIPEA), 1,8-Diazabicycloundec-7-ene (DBU).

26. The method of claim 25, wherein the secondary amine is dimethylformamide (DMF).

27. The method of claim 26, wherein the polymerization is conducted under N2 or in air.

28. The method of claim 16, wherein the polymerization is conducted by refluxing with piperidine in dioxane.

* * * * *